Patented Jan. 29, 1935

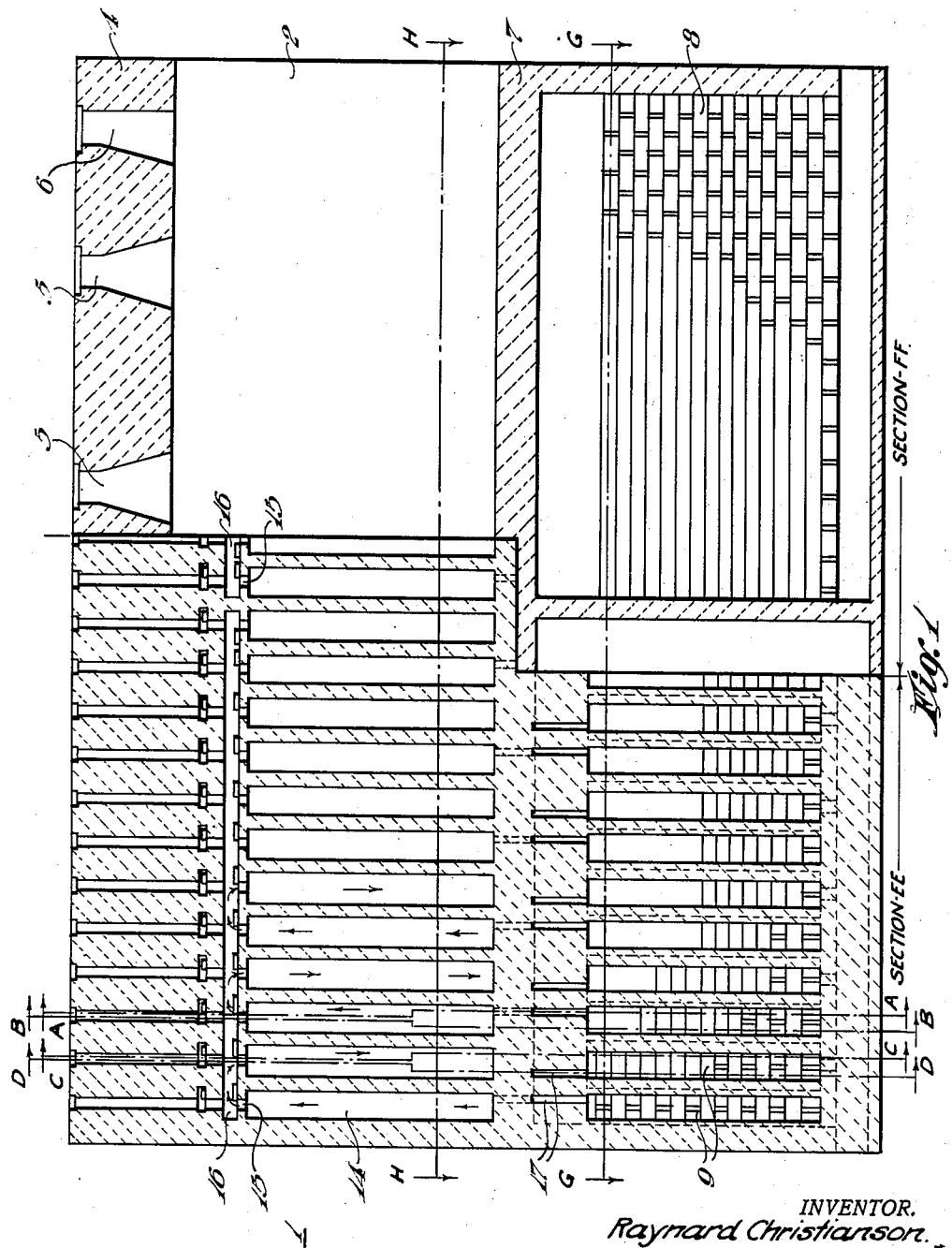

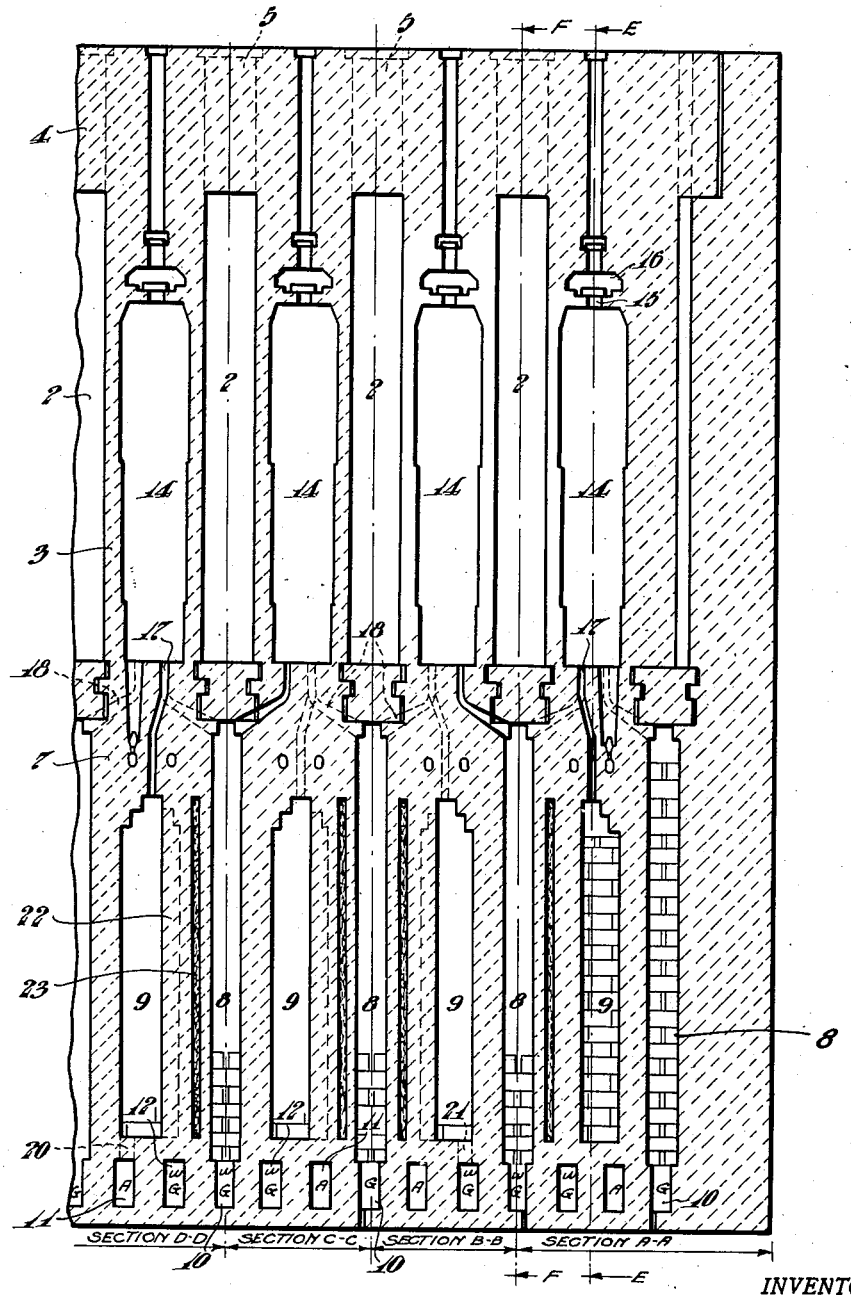

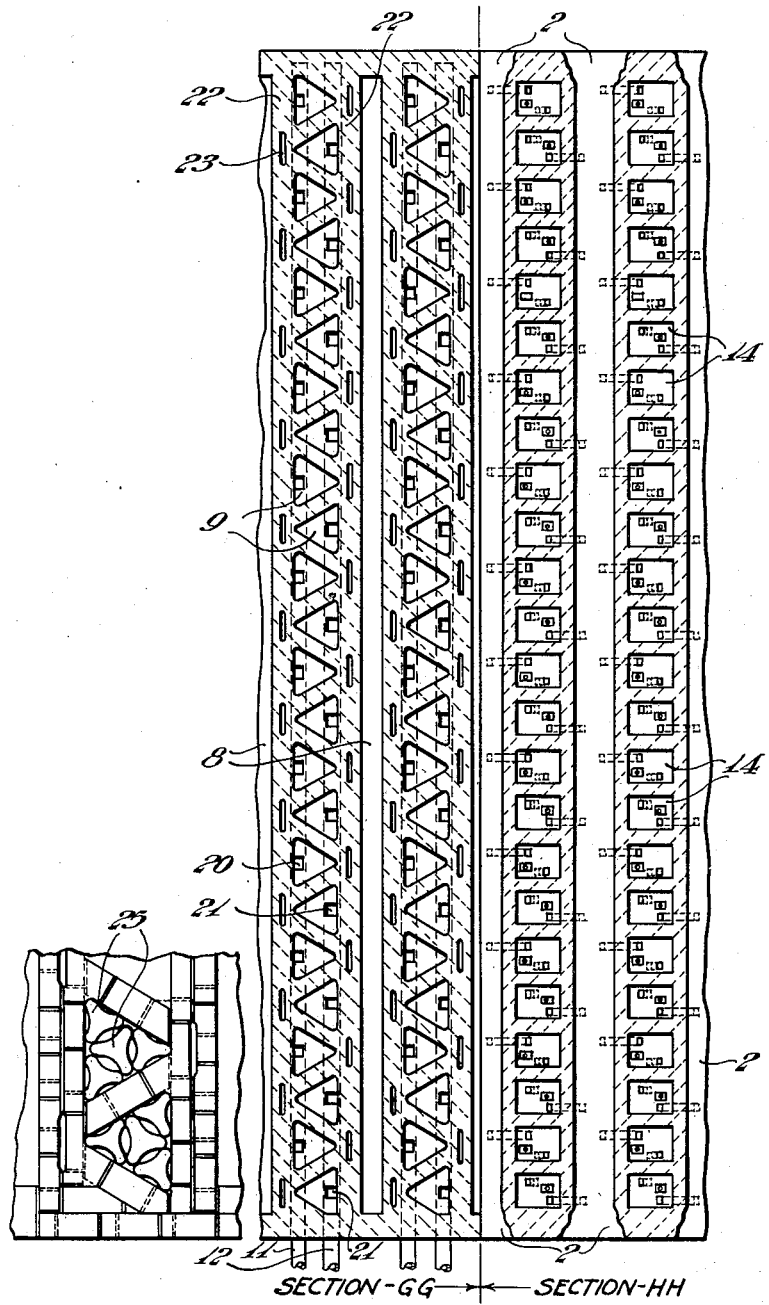

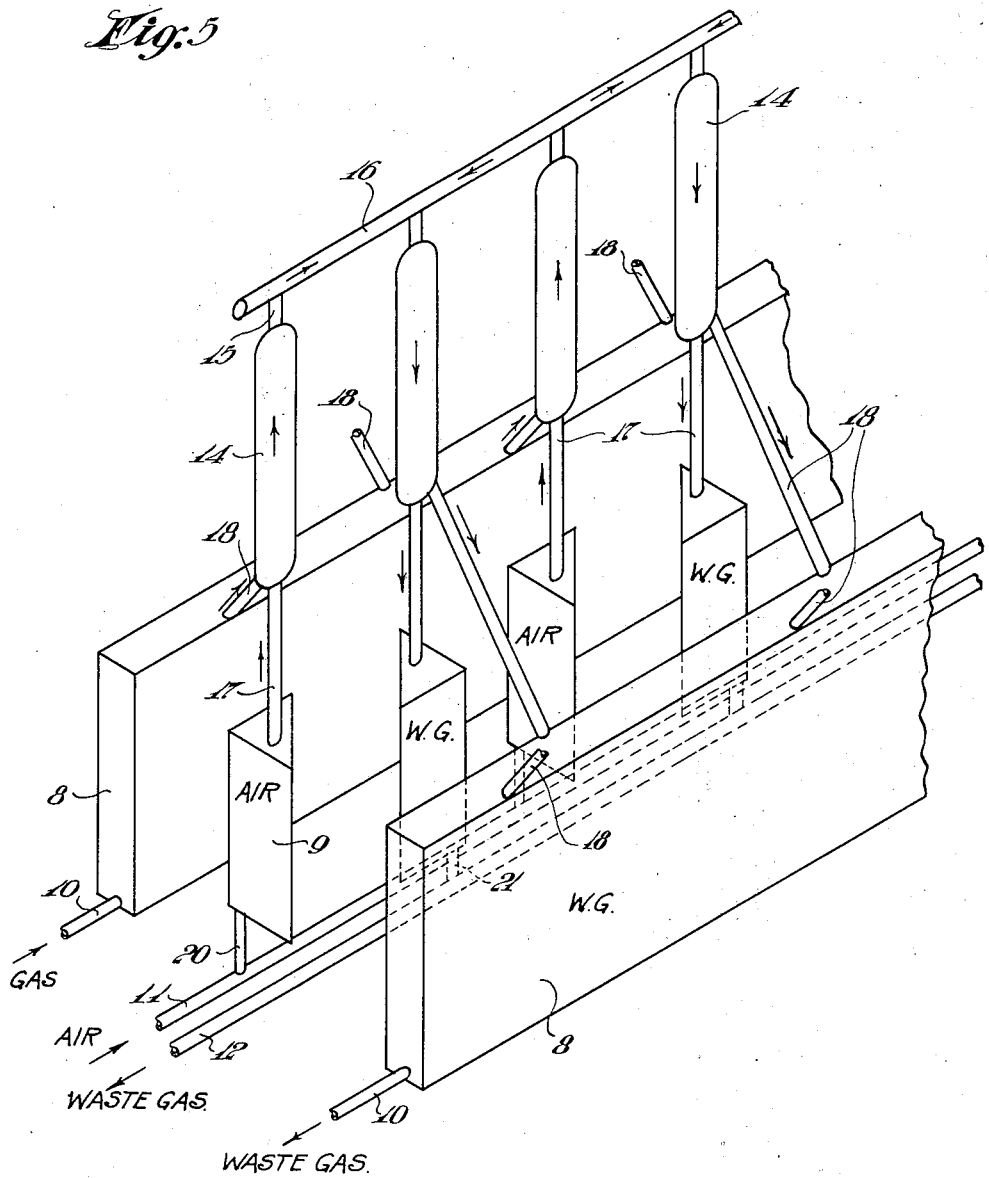

1,989,505

UNITED STATES PATENT OFFICE 1,989,505

COKING RETORT OVEN

Raynard Christianson, Fort Wayne, Ind., assignor to The Koppers Company of Delaware, a corporation of Delaware Application January 9, 1931, Serial No. 507,619

16 Claims. (Cl. 202—144)

My invention relates to coking retort ovens and particularly to heating systems therefor.

In the operation of coking retort ovens, the prevention of leakage between flues or regenerators carrying fuel gas and waste gases has always been one of the major considerations. The nature of the construction of the various walls of coking retort ovens has made it difficult to construct them in a gas-tight manner. This is particularly true by reason of the necessity for providing for the expansion of the silica bricks when the battery is heated.

It is difficult to provide an arrangement in which all of the ducts and regenerators for carrying the fuel gas and waste gases are separated by gas-tight walls or in which a duct or regenerator for carrying air is always interposed between similar conduits for fuel gas and waste gases, respectively.

In accordance with the present invention, I provide an arrangement in which the tendency for counterflow, that is, leakage between conduits for fuel gas and waste gases, is reduced to a minimum. In the coke-oven battery construction of my invention, the points or areas between which such leakage may tend to occur are so minimized that special provisions for substantially entirely preventing such leakage may be provided.

In general, I provide a system of regenerators, certain of which extend crosswise or transversely of the battery and in alinement with the oven chambers of the battery. These regenerators extend the entire width of the battery. Between each pair of adjacent crosswise regenerators is a series of triangular compartment regenerators.

Each series of triangular regenerators extends the entire width of the battery. The triangular regenerators are arranged with one side adjacent to, and parallel with, one of the adjacent crosswise regenerators while the apex of the triangular cross-section is near the other adjacent crosswise regenerator.

Adjacent triangular regenerators are oppositely disposed in the series. The wall between the apex of each triangular regenerator and the adjacent crosswise regenerator is provided with a slot filled with comminuted refractory material for preventing leakage between these regenerators. The sole flues connected to the several triangular regenerators are so arranged that alternate triangular regenerators carry air, while the other triangular regenerators carry waste gases and conditions are reversed in these regenerators when the direction of flow within the battery is reversed.

Alternate crosswise regenerators carry waste gases while the other crosswise regenerators carry fuel gas. The triangular regenerators whose sides are adjacent a crosswise regenerator carrying waste gases carry waste gases also so that there is no tendency for counterflow through these portions of the walls. The arrangement above described insures that the only portions of partition walls at which counterflow is likely to occur are those between the apex of each triangular regenerator carrying waste gases and the adjacent crosswise regenerator carrying fuel gas.

The details of my invention will be described in connection with the accompanying drawings, in which Figure 1 is a composite transverse vertical sectional view of a coke-oven battery, taken on lines E—E and F—F, respectively, of Fig. 2;

Fig. 2 is a composite vertical longitudinal sectional view of a portion of the battery taken on lines A—A, B—B, C—C and D—D, respectively, of Fig. 1;

Fig. 3 is a composite horizontal sectional view of a portion of the coke-oven battery, taken on lines G—G and H—H, respectively, of Fig. 1;

Fig. 4 is an enlarged horizontal sectional view of the structure of certain of the triangular regenerators; and Fig. 5 is a partially diagrammatic view, in perspective, of a portion of the heating system of the coke-oven battery of my invention.

Referring to the drawings, a coke-oven battery 1 comprises a series of alternately-disposed oven chambers 2 and heating walls 3 that extend transversely of the battery. The oven chambers 2 are preferably of the well-known horizontal type, although my invention is not necessarily limited thereto. The battery is provided, also, with a top or roof 4, having the usual charging openings 5 and gas offtake openings 6.

Beneath the oven chambers 2 and heating walls 3 is horizontal brickwork 7, which separates the oven chambers and heating walls from a system of regenerators that are located therebeneath. These regenerators, as indicated most clearly in Figs. 2 and 3, comprise crosswise regenerators 8 that are located beneath the oven chambers 2 and extend transversely of the battery for its entire width. Between each pair of adjacent crosswise regenerators 8 is a series of vertical triangular regenerators 9, each series extending transversely of the battery beneath the heating walls 3. Each of the crosswise regenerators 8 is provided with a sole flue 10 and sole flues 11 and 12 are connected to alternate triangular flues, respectively.

Each of the heating walls 3 is provided with a series of vertical flame flues 14 that are substantially rectangular in horizontal cross-section and that are provided at their tops with ducts 15, which open into a horizontal flue 16. Each heating wall is provided with two horizontal flues 16 that divide the flame flues 14 into two groups. Each flame flue 14 is connected by means of a substantially vertical duct 17 to one of the triangular regenerators 9. The triangular regenerators, which are of the compartment type, are individual to the flame flue to which they are respectively connected.

Each flame flue 14 is also connected to one of the crosswise regenerators 8 by an inclined duct 18, alternate flame flues being connected to a regenerator 8 on one side to a series of triangular regenerators with which the flame flues of that heating wall are connected, and the other flame flues of the heating wall being connected to the regenerator 8 on the other side of the series of triangular regenerators. This system of connections is clearly shown in Fig. 5.

As clearly shown in Figs. 3, 4 and 5, the triangular regenerators are arranged with one side in alinement with one of the adjacent crosswise regenerators 8, the apex of the triangular cross-section being adjacent the other crosswise regenerator. Inasmuch as the adjacent triangular regenerators are oppositely disposed in the series, alternate triangular regenerators will present a side to one of the crosswise regenerators while the other triangular regenerators will present a side to the other crosswise regenerator.

The sole flues 11 are connected through ducts 20 to the triangular regenerators 9 that are disposed in one position in a series while the sole flues 12 are connected through ducts 21 to the other triangular regenerators of that series. The partition walls 22, which separate each crosswise regenerator from the adjacent series of triangular regenerators, are each provided with a series of vertical slots 23, each of which extends between the apex of a triangular regenerator and a crosswise regenerator 8. The slots 23 are each filled with suitable comminuted refractory material, such, for example, as rock wool, in order to prevent leakage through the joints of the partition wall 22. The locations of the slots 23 with respect to the triangular regenerators and the partition walls 22 are clearly shown in Fig. 4.

The details of the triangular regenerators 9 are clearly shown in Fig. 4. It will be observed that the checkerbricks 25 are of substantially triangular form with concave sides. Checkerbricks 25 are located in each corner of the triangular regenerators and in the central portion of the regenerator. The concave sides provide spaces between the different checkerbricks and also between the latter and the regenerator walls for the passage of gases therethrough. By means of this arrangement, only one type of checkerbrick is required.

In the operation of the coke-oven battery constructed and arranged as described above in accordance with my invention, the sole flues 10 are so connected that alternate regenerators 8 are supplied with fuel gas, such as producer gas, from any suitable or usual source, while the other crosswise regenerators 8 are arranged to conduct waste gases from the flame flues 14 to which they are respectively connected. The sole flues 11 may, for example, be arranged to supply air to the triangular regenerators 9 to which they are connected, while the sole flues 12 are arranged to conduct waste gases from the triangular flues and flame flues 14 to which they are connected.

It may be assumed, for example, that the several sole flues 10, 11 and 12 are arranged to convey combustible media, as indicated by legends in Fig. 2, the legends G, A and WG, respectively, indicating fuel gas, air and waste gases. It will be noted that each sole flue 10 carrying fuel gas is between two sole flues 11 carrying air and which latter separate the sole flue 10 carrying fuel gas from the sole flues 12 carrying waste gases. It will be noted, also, that the sole flues carrying waste gases are in groups of three comprising one sole flue 10 and two sole flues 12 on opposite sides thereof.

The flow of gases through a heating wall will be readily understood by reference to Fig. 5, in conjunction with the other views. Fuel gas flows through a crosswise regenerator 8 and through inclined ducts 18 into alternate flame flues 14 of each of two heating walls. Air is supplied to the same alternate flame flues 14 through triangular regenerators 9 and ducts 17.

Combustion occurs in these alternate flame flues and the gases of combustion pass upwardly through ducts 15 into the horizontal flues 16. The gases of combustion of each heating wall then pass laterally in either direction along the horizontal flues 16, downwardly through ducts 15 and the other flame flues 14, and out through the connected ducts 17 and 18, triangular regenerators 9 and crosswise regenerator 8 and the corresponding sole flues 12 and 10 to the usual waste-gas main.

It will be noted that each of the triangular regenerators carrying waste gas has the apex of its triangular cross-section adjacent the crosswise regenerator 8 carrying fuel gas. Inasmuch as there is a pressure differential between the regenerators for carrying fuel gas and waste gases, respectively, there will be a tendency for the fuel gases to leak into the regenerators or conduits carrying waste gases. Since, however, the adjacent areas of these regenerators have been reduced to substantially a line, the slots 23 filled with comminuted material operate effectually to seal the joints through which such leakage could occur and there is a substantially entire prevention of leakage.

When the direction of flow of gases within the battery is reversed, as occurs periodically in the usual operation, the functions of the several crosswise regenerators 8 are reversed. That is, the regenerators 8 that were conveying fuel gas now constitute outflow regenerators for conveying waste gases, and regenerators formerly conveying waste gases now constitute inflow regenerators for conveying fuel gas. Similarly, each of the triangular regenerators that previously conveyed air now constitute outflow regenerators for conveying waste gases in parallel with the crosswise regenerators performing a similar function and the triangular regenerators previously conveying waste gases now operate as inflow regenerators for conveying air.

It will be noted that the same conditions obtain with respect to the relations between crosswise regenerators carrying fuel gas and triangular regenerators carrying waste gases in that only the apex of each of the latter regenerators is adjacent to the side of one of the crosswise regenerators carrying fuel gas. It will be noted furthermore that the direction of gases in the various ducts 17 and 18 are reversed and that combustion occurs in flame flues 14 formerly conveying waste gases. Also, flame flues 14 in which combustion occurred during the previous period now carry waste gases downwardly, the horizontal flue 16 serving to distribute and equalize the flow of waste gases.

As in the previous combustion period, the sole flues carry combustible media in the same order and there is always a sole flue carrying air between a sole flue carrying fuel gas and one carrying waste gases. Furthermore, the sole flues carrying waste gases are in groups of three.

In the coke-oven structure of my invention, the arrangement of the regenerators is such that the tendency for leakage between those carrying fuel gas and waste gases, respectively, is reduced to a minimum. Means are provided for preventing leakage at the relatively small areas where such leakage might otherwise occur. The arrangement is symmetrical in that the same relations exist between the regenerators during each reversal of flow of gases through the battery.

The sole flues are so arranged that a sole flue carrying air is always interposed between a sole flue carrying fuel gas and one carrying waste gases.

The foregoing and other advantages will be apparent to those skilled in the art of construction and operation of coking retort ovens.

I claim as my invention:

1. Coke-oven structure comprising a heating wall having a series of units each of which comprises at least one vertical flame flue, a series of regenerators beneath said heating wall and co-extensive therewith, each of said regenerators being individual to one of said units comprising at least one flame flue and being respectively connected thereto, said regenerators being triangular in horizontal cross-section and adjacent regenerators being oppositely disposed in the series so that an apex of each of some of the triangular regenerators faces on one side of the series thereof and the apex of each of others of said regenerators adjacent said some of the triangular regenerators faces the opposite side of the series of triangular regenerators.

2. Coke-oven structure comprising two horizontally elongated oven chambers and a heating wall therefor therebetween that is provided with a series of flame flues, two horizontally elongated regenerators beneath said oven chambers, respectively, and parallel thereto and substantially co-extensive therewith, a series of regenerators beneath said heating wall, each of the regenerators of said series being individual to one of said flame flues, each of the regenerators of said series of regenerators being communicably connected with the flame flue to which it is individual, and each of some of the flame flues being communicably connected with one of the two horizontally elongated regenerators and each of the other flame flues being communicably connected with the other of the two horizontally elongated regenerators.

3. Coke-oven structure comprising two horizontally elongated oven chambers and a heating wall therefor therebetween that is provided with a series of flame flues, two horizontally elongated regenerators beneath said oven chambers, respectively, and parallel thereto and substantially co-extensive therewith, a series of regenerators beneath said heating wall and equal in number to the flame flues, and means for individually connecting each of said flame flues to one regenerator of said series of regenerators, respectively, and means communicably connecting each of some of the flame flues with one of the two horizontally elongated regenerators and each of the other flame flues with the other of the two horizontally elongated regenerators.

4. Coke-oven structure comprising two horizontally elongated oven chambers and a heating wall therefor therebetween that is provided with a series of flame flues, two horizontally elongated regenerators beneath said oven chambers, respectively, and parallel thereto and substantially co-extensive therewith, a series of regenerators beneath said heating wall and equal in number to the flame flues, and means for connecting each of said flame flues to one regenerator of said series of regenerators, respectively, and for connecting alternate flues of said heating wall to one of said two horizontally elongated regenerators and the other flues to the other of said two horizontally elongated regenerators.

5. Coke-oven structure comprising a horizontally elongated heating wall having a series of flame flues, two horizontally elongated regenerators of substantially the same length as said heating wall and parallel thereto, a series of relatively small regenerators arranged in a row between said two horizontally elongated regenerators one after the other longitudinally of said two horizontally elongated regenerators each of which is connected to one of said flues, and means for connecting certain of said flues to one of said two horizontally elongated regenerators and the others of said flues to the other of said two horizontally elongated regenerators.

6. Coke-oven structure comprising a horizontally elongated heating wall having a series of flame flues, two horizontally elongated regenerators of substantially the same length as said heating wall and parallel thereto, a series of relatively small regenerators arranged in a row between said two horizontally elongated regenerators one after the other longitudinally of said two horizontally elongated regenerators each of which is connected to one of said flues, and means for connecting alternate flues to one of said two horizontally elongated regenerators and the other flues to the other of said two horizontally elongated regenerators.

7. Coke-oven structure comprising a series of horizontally elongated oven chambers and heating walls therefor and alternating therewith, and a series of relatively large horizontally elongated regenerators parallel to, and substantially equal in length to, that of, said oven chambers and heating walls, said series of regenerators being operatively disposed in two sets operable in alternation with each other for inflow preheating of fuel gas and concurrent outflow of waste gas, and rows of relatively small regenerators alternating with the first-mentioned regenerators, each of said rows of relatively small regenerators comprising regenerators arranged one after the other in a series longitudinally of the relatively large regenerators and operatively disposed in two sets operable in alternation with each other for inflow preheating of air and concurrent waste gas outflow, each of said heating walls comprising a series of vertical flame flues, each of the large regenerators being connected to approximately half of the flame flues of each of two adjacent heating walls and each of the small regenerators being communicably connected with and individual to a single flame flue, a sole flue individual to and communicating with each of the large regenerators, a sole flue individual to and communicating with one of the sets of small regenerators in each row, a sole flue individual to and communicating with the other set of small regenerators in each row, and the sole flues for regenerators operable for inflow of fuel gas being separated from the sole flues for regenerators operable for concurrent outflow of waste gas by sole flues for regenerators operable for simultaneous inflow of air.

8. Coke-oven structure comprising a horizontal series of regenerators that are triangular in horizontal cross-section, adjacent regenerators in the series being in two sets operable in alternation with each other for inflow of combustible medium and outflow of waste gas, the regenerators of one set each having one of their apexes facing one side of the series of regenerators and the regenerators of the other set each having one of their apexes facing on the opposite side of the series, two sole flues extending adjacent the series one of which communicates with the regenerators of one of said sets and the other of which communicates with the regenerators of the other set, said sole channels being adapted for operation in alternation for inflow of combustible medium to and exhaust of waste gas from their respective regenerators.

9. Coke-oven structure comprising a horizontal series of regenerators that are triangular in horizontal cross-section, adjacent regenerators in the series being in two sets operable in alternation with each other for inflow of combustible medium and outflow of waste gas, the regenerators of one set each having one of their apexes facing one side of the series of regenerators and the regenerators of the other set each having one of their apexes facing on the opposite side of the series, a single regenerator on each side of the series of triangular regenerators and substantially co-extensive with said series, the single regenerators on each side of said series being operable for reverse flow to that in the triangular regenerators whose apexes face them.

10. Coke-oven structure comprising two oblong regenerators extending horizontally, and a series of relatively small regenerators between said two generators and that are triangular in horizontal cross-section, and each of which has one side wall in common with that of one of the two regenerators and an apex of its other walls in common with a side wall of the other of the two regenerators.

11. Coke-oven structure comprising two oblong regenerators extending horizontally, and a series of relatively small regenerators between said two regenerators and that are triangular in horizontal cross-section, each of the triangular regenerators having one side parallel to a side of one of said two regenerators and having the apex of its other sides adjacent the other of said two regenerators.

12. Coke-oven structure comprising two oblong regenerators extending horizontally, and a series of relatively small regenerators between said two regenerators and that are triangular in horizontal cross-section, each of the triangular regenerators having one side parallel to a side of one of said two regenerators and having the apex of its other sides adjacent the other of said two regenerators, and means comprising a wall of refractory material having a section of comminuted material between each apex and the adjacent regenerator.

13. Coke-oven structure comprising a series of horizontally elongated oven chambers and heating walls therefor and alternating therewith, a series of relatively large horizontally elongated regenerators parallel to, and substantially equal in length to that of, said oven chambers and heating walls and rows of relatively small regenerators alternating with the first-mentioned regenerators, each of said heating walls comprising a series of vertical flame flues each of said rows of relatively small regenerators comprising regenerators arranged one after the other in a series longitudinally of the relatively large regenerators each of which is connected to one of the small regenerators, respectively, and to one of the large regenerators, and means comprising sole flues connected to said regenerators for alternately transmitting fuel gas to, and waste gases from each of the large regenerators and for alternately transmitting air to, and waste gases from each of the small regenerators.

14. Coke-oven structure comprising two oblong regenerators extending horizontally, a series of relatively small regenerators between said two regenerators and that are triangular in horizontal cross-section, and each of which has one side wall in common with that of one of the two regenerators and an apex of its other walls in common with a side wall of the other of the two regenerators, and means comprising sole flues connected to said regenerators for alternately transmitting waste gases from each of the two oblong regenerators while the other transmits fuel gas and for transmitting air to the triangular regenerators with a side wall in common with an oblong regenerator transmitting fuel gas and for transmitting waste gases from the other triangular regenerators.

15. Coke-oven structure comprising a series of horizontally elongated oven chambers and heating walls therefor and alternating therewith, a series of relatively large horizontally elongated regenerators parallel to, and substantially equal in length to that of, said oven chambers and heating walls and rows of relatively small regenerators alternating with the first-mentioned regenerators, each of said rows of relatively small regenerators comprising regenerators arranged one after the other in a series of longitudinally of the relatively large regenerators each of said heating walls comprising a series of vertical flame flues each of which is connected to one of the small regenerators, respectively, and to one of the large regenerators, and means comprising sole flues connected to said regenerators for alternately transmitting fuel gas to, and waste gases from, each of the large regenerators and for alternately transmitting air to, and waste gases from, each of the small regenerators, said sole flues being so disposed and arranged that a sole flue adapted for carrying air is always between sole flues adapted for carrying fuel gas and waste gases, respectively.

16. Coke-oven structure comprising a series of horizontally elongated oven chambers and heating walls therefor and alternating therewith, a series of relatively large horizontally elongated regenerators parallel to, and substantially equal in length to that of, said oven chambers and heating walls and rows of relatively small regenerators alternating with the first-mentioned regenerators, each of said rows of relatively small regenerators comprising regenerators arranged one after the other in a series longitudinally of the relatively large regenerators each of said heating walls comprising a series of vertical flame flues each of which is connected to one of the small regenerators, respectively, and to one of the large regenerators, and means comprising a row of sole flues connected to said regenerators for alternately transmitting fuel gas to, and waste gases from, each of the large regenerators and for alternately transmitting air to, and waste gases from each of the small regenerators, said sole flues being so disposed and arranged relative to each other in said row that the sole flues thereof are always in the following order, sole gas flues adapted for conveying waste gas, waste gas, waste gas, air, fuel gas, and air, respectively.

RAYNARD CHRISTIANSON.